United States Patent [19]

Wideman et al.

[11] Patent Number: 5,434,206
[45] Date of Patent: Jul. 18, 1995

[54] SILICA REINFORCED RUBBER COMPOSITIONS CONTAINING DIAMINODIROSINATE SALTS

[75] Inventors: Lawson G. Wideman; Paul H. Sandstrom, both of Tallmadge, Ohio

[73] Assignee: The Goodyear Tire & Rubber Company, Akron, Ohio

[21] Appl. No.: 303,902

[22] Filed: Sep. 9, 1994

[51] Int. Cl.⁶ .................................................. C08K 3/20
[52] U.S. Cl. .................................. 524/241; 524/274; 524/172
[58] Field of Search .................. 524/241, 274, 172

[56] References Cited

U.S. PATENT DOCUMENTS 3,313,754  4/1967  Logan ........................... 260/27
5,118,740  6/1992  Wideman et al. ............. 524/172
5,162,409  11/1992  Mroczkowski ................ 524/262

Primary Examiner—Peter D. Mulcahy
Attorney, Agent, or Firm—Bruce J. Hendricks

[57] ABSTRACT

The present invention relates to the use of diaminodirosinate salts as coupling agents for siliceous fillers in rubber polymers.

18 Claims, No Drawings

SILICA REINFORCED RUBBER COMPOSITIONS CONTAINING DIAMINODIROSINATE SALTS

BACKGROUND OF THE INVENTION

For many years, siliceous fillers have been used in rubber. Recently, particular interest has risen in the rise of siliceous fillers in tread formulations in pneumatic tires. It is claimed that such tread formulation have improved rolling resistance. Conventionally, organosilane coupling agents are used in combination with the siliceous fillers and rubber. Unfortunately, many of the organosilane coupling agents are expensive or are of limited commercial sources.

SUMMARY OF THE INVENTION

The present invention relates to the use of diaminodirosinate salts as coupling agents for siliceous fillers in curable rubber.

DETAILED DESCRIPTION OF THE INVENTION

There is disclosed a composition comprising (a) a diaminodirosinate salt of the formula

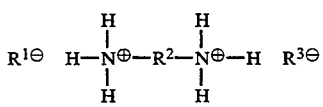

where $R^1$ and $R^3$ may be the same or different and are selected from the group consisting of

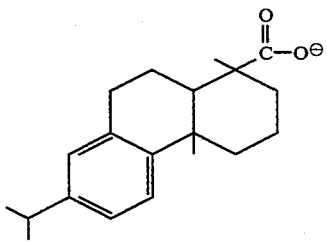

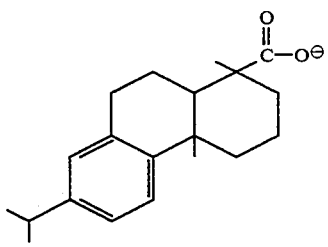

and mixtures thereof and wherein $R^2$ is selected from the group consisting of divalent alkylenes having from to 12 carbon atoms; (b) a siliceous filler and (c) a rubber polymer, the diaminodirosinate salt being present in an amount of 0.1 to 50 parts per 100 parts of polymer and the siliceous filler being present in an amount of from 10 to 250 parts per 100 parts of polymer.

There is also disclosed a process for improving the reinforcing properties of a rubber polymer containing siliceous filler comprising adding from 0.1 to 50 parts per 100 parts of polymer of a diaminodirosinate salt wherein said diaminodirosinate salt is of the formula

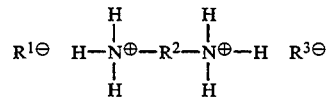

wherein $R^1$ and $R^3$ may be the same or different and are selected from the group consisting of

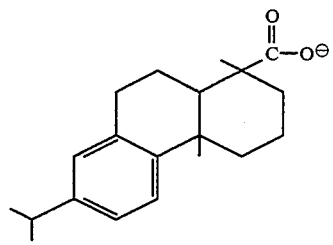

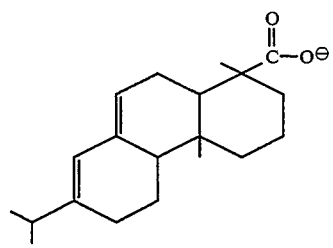

mixtures thereof and wherein $R^2$ is a selected from the group consisting of divalent alkylenes having from 2 to 12 carbon atoms.

In addition, there is disclosed a pneumatic tire having a tread comprised of (A) 100 parts by weight of a rubber poller; (B) from 10 to 250 phr of a siliceous filler; and (C) from 0.1 to 50 phr of a diaminodirosinate salt of the formula

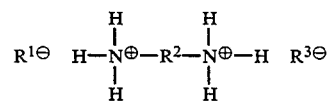

wherein $R^1$ and $R^3$ may be the same or different and are selected from the group consisting of

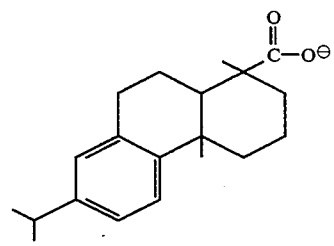

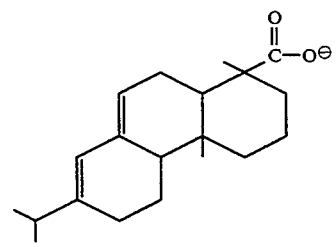

and mixtures thereof and wherein $R^2$ is selected from the group consisting of divalent alkylenes having 2 to 12 carbon atoms.

The diaminodirosinate salt is prepared by reacting an aliphatic diamine compound with abietic acid or dehydroabietic acid. Abietic acid and dehydroabietic acid are derived from rosin. Rosin is a solid resinous material that occurs naturally in pine trees. The three major sources of rosin are gum rosin, wood rosin and tall oil rosin. Gum rosin is from the oleoresin extrudate of the living pine tree. Wood rosin is from the oleoresin contained in the aged stumps. Tall oil rosin is from the waste liquor recovered as a by-product in the Kraft paper industry.

The aged virgin pine stump is the source of wood rosin. The stump is allowed to remain in the ground for about ten years so that its bark and sapwood may decay and slough off to leave the heartwood rich in resin. It is known that production of pine stump rosin can be artificially stimulated by injecting the herbicide, Paraquat, into the lower portion of the tree. This treatment of the stump produces Pinex TM rosin.

Rosins derived from both oleoresin and aged stump wood are composed of approximately 90 percent resin acids and 10 percent nonacidic components. Chemical treatment of rosins, such as hydrogenation, dehydrogenation or polymerization are known which produce modified resins.

Rosin acids are monocarboxylic acids having the typical molecular formula, $C_{20}H_{30}O_2$. The two major rosin acids that may be used to prepare the bis-amide linked rosin acid derivative are abietic acid of the structural formula:

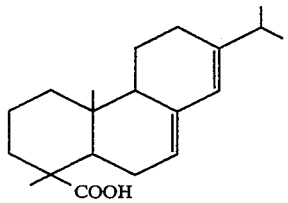

and dehydroabietic acid, having the structural formula:

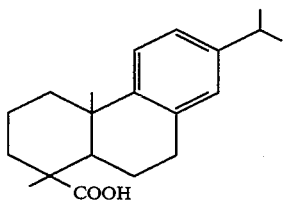

These acids are generally in a mixture with various amounts of other rosin acids including levopimaric, neoabietic, palustric, tetrahydroabietic, pimaric, isopimaric, Δ-isopimaric, elliotinoic and sandaracopimaric. These acids can be used in combination with the abietic or dehydroabietic acid to form the silica coupling agents for use in the present invention. Therefore, in connection with the above formula, $R^1$ and $R^3$ may contain the moiety derived from levopimaric, neoabietic, palustric, tetrahydroabietic, pimaric, isopimaric, Δ-isopimaric, elliotinoic or sandaracopimaric acid.

The acid number for the rosin acid may vary. Generally the acid number ranges from about 160 to about 175. Preferably the acid number is below 170 with a range of from about 165 to about 168 being particularly preferred.

The rosin acid is reacted with an aliphatic diamine under suitable conditions to form a compound having two rosin moieties connected by two ion bond linkages. Representative aliphatic diamines which may be used include ethylene diamine, 1,3-propylene diamine, 2,2-dimethyl-propylene diamine, 1,4-butylene diamine, 2-methyl-1,5-pentanediamine, 1,5-pentylene diamine, 1,6-hexylene diamine, 2,5-dimethyl-1,6-hexamethylene diamine, 3-methyl-1,7-heptamethylene diamine, 4,4-dimethyl-1,7-heptamethylene diamine, 1,7-heptamethylene diamine, 2,5-dimethyl-1,7-heptamethylene diamine, 3-methyl-1,7-heptamethylene diamine, 1,8-octamethylene diamine, 1,9-nonamethylene diamine, 1,10-decamethylene diamine, 1,11-undecane diamine, 2,11-dodecane diamine, 1,12-dodecamethylene diamine and the various isomers and mixtures thereof. Secondary and tertiary dieunines will also form diaminodirosinate salts. Representative examples are tetramethyl ethylene diamine and dimethyl ethylene diamine.

With respect to the above formula depicting the diaminodirosinate salt, $R^2$ may be an alkylene ranging from 2 to 12 carbon atoms. Preferably, $R_2$ is an alkylene ranging from 2 to 6 carbon atoms.

The rosin acid may be reacted with the aliphatic diamine in a variety of mole ratios. Generally the mole ratio of rosin acid to aliphatic diamine ranges from about 1.5:1 to about 2.5:1 with a range of from about 2.1:1 to about 1.9:1 being preferred.

An organic solvent may be used to dissolve the rosin acid and the aliphatic diamine. The solvent is preferably inert to the salt forming reaction. Illustrative of solvents suitable for use in the practice of this invention include: saturated and aromatic hydrocarbons; e.g., hexane, octane, dodecane, naphtha, decalin, tetrahydronaphthalene, kerosene, mineral oil, cyclohexane, cycloheptane, alkyl cycloalkane, benzene, toluene, xylene, alkyl-naphthalene, and the like; ethers such as tetrahydrofuran, tetrahydropyran, diethylether, 1,2-dimethoxybenzene, 1,2-diethoxybenzene, the mono- and dialkylethers of ethylene glycol, propylene glycol, butylene glycol, diethylene glycol, dipropylene glycol, oxyethyleneoxypropylene glycol, and the like; fluorinated hydrocarbons that are inert under the reaction conditions such as perfluoroethane, monofluorobenzene, and the like. Another class of solvents are sulfones such as dimethylsulfone, diethylsulfone, diphenolsulfone, sulfolane, and the like. Mixtures of the aforementioned solvents may be employed so long as they are compatible with each other under the conditions of the reaction and will adequately dissolve the rosin acid, dissolve the diamine and not interfere with the salt-forming reaction.

The salt forming reaction should not be conducted in the presence of an acid catalyst because a condensation reaction would occur and no salts would be formed. As can be appreciated by one skilled in the art, a condensation reaction would result in amide bonds and not the desired ionic bond linkages.

The salt forming reaction may be conducted over wide temperatures. The temperatures may range from moderate to an elevated temperature. In general, the reaction may be conducted at a temperature of between about 20° C. to about 100° C. The preferred temperature range is from about 40° C. to about 60° C., while the most preferred temperature range is from about 42° C. to about 52° C.

The salt forming reaction may be conducted under a variety of pressures. Pressures ranging from about 0 psig to about 100 psig may be used to conduct the reaction.

The salt forming reaction is conducted for a period of time sufficient to produce the desired diaminodirosinate salts. In general, the reaction time can vary from minutes to several hours. If the more sluggish reaction conditions are selected, then the reaction time will have to be extended until the desired product is produced. It is appreciated that the residence time of the reactants will be influenced by the reaction temperature, total gas pressure, partial pressure exerted by its components, concentration and choice of solvent, and other factors. Desirably, the salt forming reaction is conducted until all free carboxylic acid functional groups have been consumed.

The process for the preparation of the diaminodirosinate salt may be carried out in a batch, semi-continuous or continuous manner. The salt forming reaction may be conducted in a single reaction zone or in a plurality of reaction zones, in series or in parallel. The reaction may be conducted intermittently or continuously in an elongated tubular zone or in a series of such zones. The material of construction of the equipment should be such as to be inert during the reaction. The equipment should also be able to withstand the reaction temperatures and pressures. The reaction zone can be fitted with internal and/or external heat exchangers to control temperature fluctuations. Preferably, an agitation means is available to ensure the uniform reaction. Mixing induced by vibration, shaker, stirrer, rotating, oscillation, etc, are all illustrative of the types of agitation means which are contemplated for use in preparing the composition of the present invention. Such agitation means are available and well known to those skilled in the art.

Generally speaking, the level of diaminodirosinate salts may range from 0.1 to 50 parts by weight based on 100 parts by weight or rubber polymer (phr). Preferably, the level of diaminodirosinate salt ranges from 0.5 to 15 phr. The weight ratio of the diaminodirosinate salt to siliceous filler may vary. Generally speaking, the weight ratio of the diaminodirosinate salt to siliceous filler ranges from 1:100 to 1:5. Preferably, the weight ratio range from 1:20 to 1:10.

The term "phr" as used herein, and according to conventional practice, refers to "parts by weight of a respective material per 100 parts by weight of rubber, or elastomer".

In the description of this invention, the terms "rubber" and "elastomer" may be used interchangeably, unless otherwise prescribed. The terms "rubber composition", "compounded rubber" and "rubber compound" are used interchangeably to refer to rubber which has been blended or mixed with various ingredients and materials and such terms are well known to those having skill in the rubber mixing or rubber compounding art.

At least one rubber which is used as the silica reinforced rubber composition of the present invention is a diene-based elastomer, or rubber. Thus, it is considered that the elastomer is a sulfur curable elastomer. Such elastomer, or rubber, may be selected, for example, from at least one of cis 1,4-polyisoprene rubber (natural and/or synthetic, and preferably natural rubber), 3,4-polyisoprene rubber, styrene/butadiene copolymer rubbers, styrene/isoprene/butadiene terpolymer rubbers, cis 1,4-polybutadiene rubber and mixtures thereof.

In one aspect the rubber is preferably of at least two of diene based rubbers. For example a combination of two or more rubbers is preferred such as cis 1,4-polyisoprene rubber (natural or synthetic, although natural is preferred), 3,4-polyisoprene rubber, styrene/isoprene/butadiene rubber, emulsion and solution polymerization derived styrene/butadiene rubbers, cis 1,4-polybutadiene rubbers and emulsion polymerization prepared butadiene/acrylonitrile copolymers.

In one aspect of this invention, an emulsion polymerization derived styrene/butadiene (E-SBR) might be used having a relatively conventional styrene content of about 20 to about 28 percent bound styrene or, for some applications, an E-SBR having a medium to relatively high bound styrene content, namely a bound styrene content of about 30 to about 45 percent.

The relatively high styrene content of about 30 to about 45 for the E-SBR can be considered beneficial for a purpose of enhancing traction, or skid resistance, of the tire tread. The presence of the E-SBR itself is considered beneficial for a purpose of enhancing processability of the uncured elastomer composition mixture, especially in comparison to a utilization of a solution polymerization prepared SBR (S-SBR).

By emulsion polymerization prepared E-SBR, it is meant that styrene and 1,3-butadiene are copolymerized as an aqueous emulsion. Such are well known to those skilled in such art. The bound styrene content can vary, for example, from about 5 to 50%. In one aspect, the E-SBR may also contain acrylonitrile to form a terpolymer rubber, as E-SBAR, in amounts, for example, of about 2 to about 30 weight percent bound acrylonitrile in the terpolymer.

Emulsion polymerization prepared styrene/butadiene/acrylonitrile copolymer rubbers containing about 2 to about 40 weight percent bound acrylonitrile in the copolymer are also contemplated as diene based rubbers for use in this invention.

The solution polymerization prepared SBR (S-SBR) typically has a bound styrene content in a range of about 5 to about 50, preferably about 9 to about 36, percent. The S-SBR can be conveniently prepared, for example, by organo lithium catalyzation in the presence of an organic hydrocarbon solvent.

A purpose of using S-SBR is for improved tire rolling resistance as a result of lower hysteresis when it is used in a tire tread composition.

The 3,4-polyisoprene rubber (3,4-PI) is considered beneficial for a purpose of enhancing the tire's traction when it is used in a tire tread composition.

The 3,4-PI and use thereof is more fully described in U.S. Pat. No. 5,087,668 which is incorporated herein by reference. The Tg refers to the glass transition temperature which can conveniently be determined by a differential scanning calorimeter at a heating rate of 10° C. per minute.

The cis 1,4-polybutadiene rubber (BR) is considered to be beneficial for a purpose of enhancing the tire tread's wear, or treadwear. Such BR can be prepared, for example, by organic solution polymerization of 1,3-butadiene. The BR may be conveniently characterized, for example, by having at least a 90% cis 1,4-content.

The cis 1,4-polyisoprene and cis 1,4-polyisoprene natural rubber are well known to those having skill in the rubber art.

The vulcanized rubber composition should contain a sufficient amount of silica, and carbon black, if used, to contribute a reasonably high modulus and high resistance to tear. The silica filler may be added in amounts ranging from 10 to 250 phr. Preferably, the silica is present in an amount from 15 to 80 phr. The combined weight of the silica and carbon black, as hereinbefore referenced, may be range from 30 phr to 120 phr but is preferably from about 45 to about 90 parts by weight. Where the rubber composition contains both silica and carbon black, the weight ratio of silica to carbon black is at least 1/5. Preferably, the weight ratio of silica to carbon black ranges from 1/3 to 30/1.

The commonly employed siliceous pigments or fillers used in rubber compounding applications can be used as the silica in this invention, including pyrogenic and precipitated siliceous pigments (silica), although precipitate silicas are preferred. The siliceous pigments preferably employed in this invention are precipitated silicas such as, for example, those obtained by the acidification of a soluble silicate, e.g., sodium silicate.

Such silicas might be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society*, Volume 60, page 304 (1930).

The silica may also be typically characterized by having a dibutylphthalate (DBP) absorption value in a range of about 100 to about 400, and more usually about 150 to about 300.

The silica might be expected to have an average ultimate particle size, for example, in the range of 0.01 to 0.05 micron as determined by the electron microscope, although the silica particles may be even smaller, or possibly larger, in size.

Various commercially available silicas may be considered for use in this invention such as, only for example herein, and without limitation, silicas commercially available from PPG Industries under the Hi-Sil trademark with designations 210, 243, etc; silicas available from Rhone-Poulenc, with, for example, designations of Z1165MP and Z165GR and silicas available from Degussa AG with, for example, designations VN2 and VN3, etc. The PPG Hi-Sil silicas are currently preferred.

In addition to the rubber, the rubber stock may contain conventional additives including reinforcing agents, fillers, peptizing agent, pigments, stearic acid, accelerators, sulfur vulcanizing agents, antiozonants, antioxidants, processing oils, activators, initiator, plasticizers, waxes, prevulcanization inhibitors, extender oils and the like. Representative of reinforcing agents include carbon black, which is typically added in amounts ranging from about 20 to about 100 phr. Preferably, carbon black is used in amounts ranging from about 45 to about 85 phr. Typical carbon blacks that are used include N-220, N-330, N-347, N-110, N-300, N-550, N-234 and N-339. Representative of conventional accelerators are amines, guanidines, thioureas, thiols, thiurams, sulfenamides, dithiocarbamates and xanthates which are typically added in amounts of from about 0.2 to about 5 phr. Representative of sulfur vulcanizing agents include elemental sulfur (free sulfur) or sulfur donating vulcanizing agents, for example, an amine disulfide, polymeric polysulfide or sulfur olefin adducts. The amount of the sulfur vulcanizing agent will vary depending on the type of rubber and particular type of sulfur vulcanizing agent but generally range from about 0.1 phr to about 5 phr with a range of from about 0.5 phr to about 2 phr being preferred. Representative of the antidegradants which may be in the rubber stock include microcrystalline was, monophenols, bisphenols, thiobisphenols, polyphenols, hydroquinone derivatives, phosphites, phosphate blends, thioesters, napthylamines, diphenylamines as well as other diarylamine derivatives, para-phenylenediamines, quinolines and blended amines. Representative of a peptizing agent that may be used is pentachlorothiophenol which may be used in an amount ranging from about 0.1 to 0.4 with a range of from about 0.2 to 0.3 being preferred. Antidegradants are generally used in an amount ranging from about 0.10 phr to about 10 phr with a range of from about 4 to 6 phr being preferred. Representative of processing oils which may be used in the rubber stock include activated dithio-bisbenzanilide, poly-para-dinitrosobenzene, xylyl mercaptans, aliphatic-naphthenic aromatic resins, polyethylene glycol, petroleum oils, ester plasticizers, vulcanized vegetable oils, pine tar, phenolic resins, petroleum resins, polymeric esters and rosins. These processing oils may be used in conventional amounts ranging from about 0 to about 10 phr with a range of from about 5 to 10 phr being preferred. Representative of an initiator that may be used is stearic acid. Initiators are generally used in a conventional amount ranging from about 1 to 4 phr with a range of from about 2 to 3 phr being preferred.

Accelerators may be used in conventional amounts. In cases where only primary accelerator is used, the amounts range from about 0.5 to 2.5 phr. In cases where combinations of two or more accelerators are used, the primary accelerator is generally used in amounts ranging from about 0.5 to 2.0 phr and a secondary accelerator is used in amounts ranging from about 0.1 to 0.5 phr. Combinations of accelerators have been known to produce a synergistic effect. Suitable types of conventional accelerators are amines, disulfides, guanidines, thioureas, thiazoles, thiurams, sulfenamides, dithiocarbamates and xanthates. Preferably, the primary accelerator is a sulfenamide. If a secondary accelerator is used, it is preferably a guanidine, dithiocarbamate or thiuram compound.

The silica reinforced rubber compositions of the present invention may contain a methylene donor. The term "methylene donor" is intended to mean a compound capable of reacting with the bis amide linked rosin acid derivative and generate the resin in-situ. Examples of methylene donors which are suitable for use in the present invention include hexamethylenetetramine, hexaethoxymethylmelamine, hexamethoxymethylmelamine, lauryloxymethylpyridinium chloride, ethoxymethylpyridinium chloride, trioxan hexamethoxymethylmelamine, the hydroxy groups of which may be esterified or partly esterified, and polymers of formaldehyde such as paraformaldehyde. In addition, the methylene donors may be N-substituted oxymethylmelamines, of the general formula:

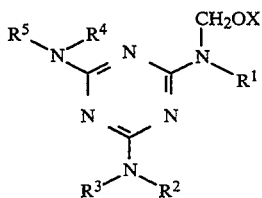

wherein X is an alkyl having from 1 to 8 carbon atoms, $R^1$, $R^2$, $R^3$, $R^4$ and $R^5$ are individually selected from the group consisting of hydrogen, an alkyl having from 1 to 8 carbon atoms and the group —$CH_2OX$. Specific methylene donors include hexakis(methoxymethyl)-melamine, N,N'N''-trimethyl/N,N'N''-trimethylolmelamine, hexamethylolmelamine, N,N'N''-dimethylolmelamine, N-methylolmelamine, N,N'-dimethylolmelamine, N,N'N''-tris(methoxymethyl)melamine and N,N'N''-tributyl-N,N'N''-trimethylol-melamine. The N-methylol derivatives of melamine are prepared by known methods.

The amount of methylene donor that is present in the rubber stock may vary. Typically, the amount of methylene donor that is present will range from about 0.1 phr to 10.0 phr. Preferably, the amount of methylene donor ranges from about 2.0 phr to 5.0 phr.

The weight ratio of methylene donor to the bis amide linked rosin acid derivative may vary. Generally speaking, the weight ratio will range from about 1:10 to about 10:1. Preferably, the weight ratio ranges from about 1:3 to 3:1.

Pneumatic tires are conventionally comprised of a generally toroidal-shaped carcass with an outer circumferential tread adapted to be ground contacting, spaced beads and sidewalls extending radially from and connecting said tread to said beads. The tire can be built, shaped, molded and cured by various methods which will be readily apparent to those having skill in the art.

In the practice of this invention, tread containing the claimed compositions can be integral with and adhered to various tire carcass substrate rubber compositions.

A rubber composition of the present invention may 10 be used to form a tread rubber which can then be applied in the building of a green tire in which the uncured, shaped tread is built onto the carcass following which the green tire is shaped and cured. Alternatively, the tread can be applied to a cured tire carcass from which the previous tread has been buffed or abraded away and the tread cured thereon as a retread.

The following examples are presented in order to illustrate but not limit the present invention.

EXAMPLE 1

A 4-liter beaker was charged with 150 grams (0.5 mole) of tall oil rosin acid (crude abietic acid) having an acid number of 165 and 400 ml of toluene and stirred as a solution of 18.5 grams (0.25 mole) of 1,3-diaminopropane (propylene diamine) in 100 ml of toluene was added dropwise at 42° C. A mild exotherm to 52° C. resulted. A temperature of 52° C. was maintained for 1 hour with heating under a nitrogen blanket. The beaker and contents were cooled to room temperature and the toluene was removed under reduced pressure. The product was a light-colored resin having a melting point of 84°–96° C. Infrared analysis showed the shift in the carboxylic acid carbonyl absorption band of rosin acid to the higher wavelength absorption band of the carboxylate salt; similarly, the nitrogen-to-hydrogen bending vibration of the primary amine shifted to the higher wavelength bending vibration of the amine salt.

EXAMPLE 2

In this example, the diaminodirosinate salt prepared in Example 1 was evaluated as an alternative for a commonly used silica coupling agent, bis-(3-triethoxysilylpropyl) tetrasulfide (silane coupling agent), in a silica reinforced rubber composition. Rubber compositions containing the materials set out in Tables 1 and 2 were prepared in a BR Banbury mixer using three separate stages of addition (mixing),. namely, two non-productive mix stages and one productive mix stage to temperatures of 160° C., 160° C. and 120° C. and times of 4 minutes, 4 minutes and 2 minutes, respectively. The amount of coupler is listed as being "variable" in Table 3 and is more specifically set forth in Table 4.

The rubber compositions are identified herein as Samples 1, 2 and 3, with Samples 2 and 3 utilizing the silica couplers, respectively, and Sample 1 considered herein as being a control without the use of a silica coupler.

The Samples were cured at about 150° C. for about 36 minutes.

Table 2 illustrates the behavior and physical properties of the cured Samples 1, 2 and 3.

TABLE I

| 1st Non-Productive | |
|---|---|
| Natural Rubber[1] | 100.00 |
| Carbon Black | 35.00 |
| Processing Oil | 5.00 |
| Zinc Oxide | 5.00 |
| Fatty Acid | 2.00 |
| Antioxidant[2] | 2.00 |
| 2nd Non-Productive | |
| Silica[3] | 15.00 |
| Bis-(3-triethoxysilylpropyl) tetrasulfide[4] | variable |
| Diaminodirosinate salt | variable |
| Productive | |
| Sulfur | 1.40 |
| Accelerator, sulfenamide type | 1.00 |

[1]Synthetic cis 1,4-polyisoprene) marketed by The Goodyear Tire & Rubber Company under the designation Natsyn ® 2200;
[2]of the polymerized 1,2-dihydro-2,2,4-trimethyldihydroquinoline type;
[3]Silica obtained as Hi-Sil-210 from PPG Industries, Inc.;
[4]obtained as bis-(3-triethoxysilylpropyl)tetrasulfide, commercially available as Si69 from Degussa GmbH which is provided in a 50/50 blend with carbon black and, thus, considered as being 50% active when the blend is considered.

Cure properties were determined using a Monsanto oscillating disc rheometer which was operated at a temperature of 150° C. and at a frequency of 11 hertz. A description of oscillating disc rheometers can be found in the Vanderbilt Rubber Handbook edited by Robert O Babbit (Norwalk, Conn., R. T. Vanderbilt Company, Inc, 1978), pages 583–591. The use of this cure meter and standardized values read from the curve are specified in ASTMD-2084. A typical cure curve obtained on an oscillating disc rheometer is shown on page 588 of the 1978 edition of the Vanderbilt Rubber Handbook.

In such an oscillating disc rheometer, compounded rubber samples are subjected to an oscillating shearing action of constant amplitude. The torque of the oscillating disc embedded in the stalk that is being tested that is required to oscillate the rotor at the vulcanization temperature is measured. The values obtained using this cure test are very significant since changes in the rubber or the compounding recipe are very readily detected.

The following table reports cure properties that were determined from cure curves that were obtained for the two rubber formulations that were prepared. These properties include the total increase in torque (Delta Torque), minutes to 90 percent of the torque increase (t90 minutes), reversion in 60 minutes, hardness, rebound, the 300 percent/100 percent modulus ratio, Rheovibron E' and tan delta values.

TABLE II

|  |  |  | (Control) |
|---|---|---|---|
| Silane Coupling Agent, 50% active | 3 (1.5) | 0 | 0 |
| Diaminodirosinate Salt | 0 | 2 | 0 |
| Delta torque | 28.4 | 26.5 | 22.0 |
| T$_{90}$ (min) | 18.8 | 19.0 | 21.8 |
| Reversion, 60' | 1.3 | 2.2 | 3.0 |
| TS | 19.1 | 19.4 | 16.1 |
| EB | 579 | 650 | 648 |
| Mod 300/Mod 100 | 4.75 | 4.63 | 4.42 |
| Hardness, RT | 56.5 | 53.4 | 45.9 |
| Hardness, 100° C. | 52.8 | 48.9 | 42.9 |
| Rebound, RT | 47.3 | 45.5 | 42.9 |
| Rebound, 100° C. | 60.2 | 59.3 | 56.4 |
| E', 60° C. ($\times 10^{-7}$) | 10.9 | 9.8 | 7.7 |
| Tan Delta | 0.102 | 0.094 | 0.126 |
| Cord Adhesion to Nylon | 105 | 85 | 75 |
| Cord Adhesion to Polyester | 115 | 135 | 85 |
| Cord Adhesion to Flexten | 115 | 105 | 90 |

The addition of the diaminodirosinate salt provides a significant increase in delta torque, modulus ratio, hardness, rebound and E' when compared to the control compound. These values approach the compound containing the silane coupling agent. Improvements in Tan Delta (lower value) and cord adhesion to Nylon, polyester and Flexten are also noted in the data when the rosin acid derivative is present.

What is claimed is:

1. A composition comprising (a) a diaminodirosinate salt of the formula

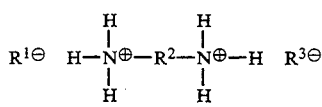

wherein $R^1$ and $R^3$ may be the same or different and are selected from the group consisting of

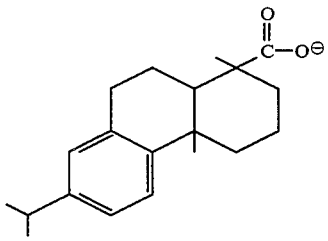

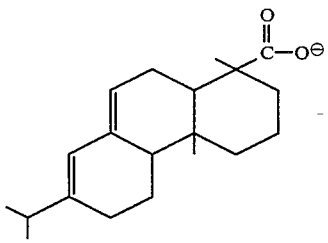

and mixtures thereof and wherein $R^2$ is selected from the group consisting of divalent alkylenes having from 2 to 12 carbon atoms, (b) a siliceous filler and (c) a rubber polymer, the diaminodirosinate salt being present in an amount of 0.1 to 50 phr and the siliceous filler being present in an amount of from 10 to 250 phr.

2. The composition of claim 1 wherein $R^2$ is a selected from the group consisting of divalent alkylenes having 2 to 6 carbon atoms.

3. The composition of claim 1 wherein in addition to abietic acid or dehydroabietic acid, $R^1$ or $R^3$ is also derived from an acid selected from the group consisting of levopimaric acid, neoabietic acid, palustric acid, tetrahydroabietic acid, pimaric acid, isopimaric acid, Δ-isopimaric acid, elliotinoic acid, sandaracopimaric acid and mixtures thereof.

4. The composition of claim 1 wherein the siliceous filler is finely divided precipitated silica.

5. The composition of claim 1 wherein the siliceous filler has a BET surface area in the range of from 40 to 600 m²/g and an average ultimate particle size in the range of from 0.01 to 0.05 mm.

6. The composition of claim 1 wherein said rubber polymer is selected from the group consisting of natural rubber, synthetic cis 1,4-polyisoprene, 3,4-polyisoprene rubber, styrene/butadiene copolymer rubber, styrene/isoprene/butadiene terpolymer rubber, cis 1,4-polybutadiene rubber and mixtures thereof.

7. A process for improving the reinforcing properties of a rubber polymer containing siliceous filler comprising adding from 0.1 to 50 parts per 100 parts of polymer of a diaminodirosinate salt wherein said diaminodirosinate salt is of the formula

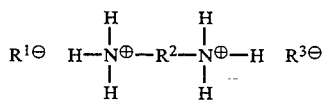

wherein $R^1$ and $R^3$ may be the same or different and are selected from the group consisting of

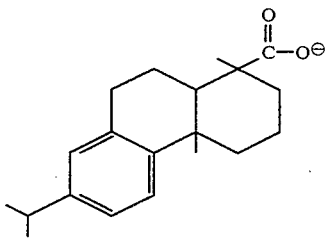

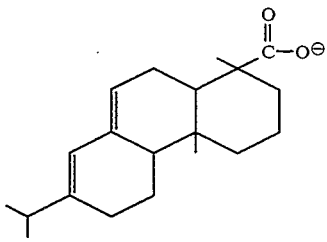

and mixtures thereof and wherein $R^2$ is selected from the group consisting of divalent alkylenes having from 2 to 12 carbon atoms.

8. The process of claim 7 wherein $R^2$ is a divalent organic radical selected from the group consisting of divalent alkylenes having 2 to 6 carbon atoms.

9. The process of claim 7 wherein in addition to abietic acid or dehydroabietic acid, $R^1$ or $R^3$ is also derived from an acid selected from the group consisting of levopimaric acid, neoabietic acid, palustric acid, tetrahydroabietic acid, pimaric acid, isopimaric acid, Δ-isopimaric acid, elliotinoic acid, sandaracopimaric acid and mixtures thereof.

10. The process of claim 7 wherein the siliceous filler is finely divided precipitated silica or pyrogenic silica.

11. The process of claim 7 wherein the siliceous filler has a BET surface area in the range of from 40 to 600 m²/g and an average ultimate particle size in the range of from 0.01 to 0.05 micron.

12. The process of claim 7 wherein said curable rubber polymer is selected from the group consisting of natural rubber, synthetic cis 1,4-polyisoprene, 3,4-polyisoprene rubber, styrene/butadiene copolymer rubber, styrene/isoprene/butadiene terpolymer rubber, cis 1,4-polybutadiene rubber and mixtures thereof.

13. A pneumatic tire having a tread comprised of (a) 100 parts by weight of a rubber polymer; (b) from 10 to 250 phr of a siliceous filler and (c) from 0.1 to 50 phr of a diaminodirosinate salt of the formula

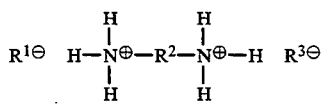

wherein $R^1$ and $R^3$ may be the same or different and are selected from the group consisting of

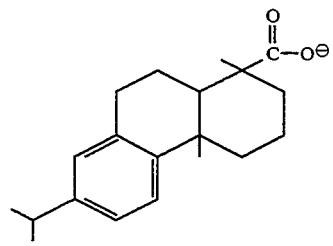

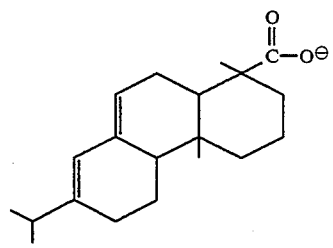

and mixtures thereof and wherein $R^2$ is selected from the group consisting of divalent alkylenes having 2 to 12 carbon atoms.

14. The pneumatic tire of claim 13 wherein $R^2$ is selected from the group consisting of divalent alkylenes having 2 to 6 carbon atoms.

15. The pneumatic tire of claim 13 wherein in addition to abietic acid or dehydroabietic acid, $R^1$ or $R^3$ is also derived from an acid selected from the group consisting of levopimaric acid, neoabietic acid, palustric acid, tetrahydroabietic acid, pimaric acid, isopimaric acid, Δ-isopimaric acid, elliotinoic acid, sandaracopimaric acid and mixtures thereof.

16. The pneumatic tire of claim 13 wherein the siliceous filler is finely divided precipitated silica.

17. The pneumatic tire of claim 13 wherein the siliceous filler has a BET surface area in the range of from 40 to 600 m²/g and an average ultimate particle size in the range of from 0.01 to 0.05 mm.

18. The pneumatic tire of claim 13 wherein said rubber polymer is selected from the group consisting of natural rubber, synthetic cis 1,4-polyisoprene, 3,4-polyisoprene rubber, styrene/butadiene copolymer rubber, styrene/isoprene/butadiene terpolymer rubber, cis 1,4-polybutadiene rubber and mixtures thereof.

* * * * *